United States Patent [19]

Okada et al.

[11] 4,209,438

[45] Jun. 24, 1980

[54] ELECTRICAL INSULATING COATING COMPOSITION

[75] Inventors: Yasunori Okada; Junzō Fukuhara, both of Hitachi, Japan

[73] Assignee: Hitachi Chemical Company, Ltd., Japan

[21] Appl. No.: 959,503

[22] Filed: Nov. 13, 1978

[30] Foreign Application Priority Data

Nov. 14, 1977 [JP] Japan .................... 52-136459

[51] Int. Cl.$^2$ .................................... C08K 5/11
[52] U.S. Cl. ................... 260/31.8 XA; 260/31.8 N
[58] Field of Search ............ 260/30.4 N, 31.2 N, 260/31.2 XA, 31.8 R, 31.8 N, 31.8 XA, 31.8 G, 31.8 H, 32.6 NR, 32.6 NT

[56] References Cited

U.S. PATENT DOCUMENTS

| | | | |
|---|---|---|---|
| 2,683,668 | 7/1954 | Godshalk | 260/31.8 XA |
| 3,401,137 | 9/1968 | Finelli | 260/31.2 N |
| 3,440,224 | 4/1969 | Impola | 260/30.6 R |
| 3,620,996 | 11/1971 | Matsumura | 260/37 N |
| 3,661,862 | 5/1972 | Bonin | 260/33.6 UB |
| 4,001,164 | 1/1977 | Chu | 260/31.8 N |
| 4,123,412 | 10/1978 | Fukuda | 260/32.6 NR |

OTHER PUBLICATIONS

D. N. Buttrey, "Plasticizers" 2nd ed., Franklin Pub. Co., Palisade, New Jersey, 1960, pp. 5–17 and 71–79.

*Primary Examiner*—Paul R. Michl
*Attorney, Agent, or Firm*—Craig and Antonelli

[57] ABSTRACT

A polyester resin, polyester-imide resin or polyester-amide-imide resin dissolved in one or more carboxylic acid esters of the formula: $R_1OOCR_2COOR_3$, wherein $R_1$ and $R_3$ are independently a lower alkyl group; and $R_2$ is a bivalent organic group, gives electrical insulating coating compositions having a high resin content and excellent various properties and being easily handled without having irritating smell.

7 Claims, No Drawings

ELECTRICAL INSULATING COATING COMPOSITION

This invention relates to an electrical insulating coating composition containing one or more special carboxylic acid esters as a solvent.

Presently, polyester resin coatings, polyurethane resin coatings and the like are used as general-purpose electrical insulating coatings. With a proceeding of miniaturization, weight-saving and high-performance of apparatuses, insulating coatings having excellent properties have been required. Thus, demand for polyester-imide resin coatings or polyester-amide-imide resin coatings having heat resistant imide groups and amide-imide groups is increasing.

As major solvents for these general-purpose and heat resistant insulating coatings, phenols such as cresol, phenol, xylenol and the like have been used. But these phenols have many defects in that they have strong irritating smell, there is a danger of producing a burn when they are touched on the skin, there should take great care for handling them, and the like.

On the other hand, a resin concentration in an insulating coating composition is generally 20 to 40% by weight and the remaining 80 to 60% by weight of one or more phenols and aromatic hydrocarbons for dilution evaporate in a baking furnace. From recent increase in price of solvents and the viewpoint of saving resources, it is desirable to use a solvent, which cannot be a component of forming film, as small as possible.

In order to solve such problems, the present inventors have studied and found that a resin produced by reacting one or more polyvalent carboxylic acids or their derivatives with one or more polyhydric alcohols can be dissolved in a special carboxylic acid ester, and accomplished this invention.

This invention provides an electrical insulating coating composition which comprises a resin prepared by reacting one or more polyvalent carboxylic acids or their derivatives with one or more polyhydric alcohols, and as a solvent one or more carboxylic acid esters of the formula:

$$R_1OOCR_2COOR_3 \tag{I}$$

wherein $R_1$ and $R_3$ are independently a lower alkyl group; and $R_2$ is a bivalent organic group.

In the above formula (I), the term "lower alkyl" includes alkyl having 1 to 6 carbon atoms such as methyl, ethyl, propyl, isopropyl, butyl, pentyl and hexyl; the term "bivalent organic group" includes, for example, —$(CH_2)_m$— in which m is an integer of 1 to 10.

The resin included in the coating composition of this invention is, for example, a polyester resin, polyester-imide resin, or polyester-amide-imide resin. Such a resin is dissolved in one or more carboxylic acid esters of the formula (I) in the coating composition of this invention.

As to the resin used in this invention, it is preferable to use one or more tri- or higher polyhydric alcohols in an amount of 35% by equivalent or more based on the total hydroxyl group equivalent of the polyhydric alcohol component in order to react the acid component with the alcohol component. If the tri- or higher polyhydric alcohols are used less than 35% by equivalent based on the total hydroxyl group equivalent of the polyhydric alcohol component, the resulting resin hardly dissolves in the carboxylic acid ester of the formula (I).

In the reaction of one or more polyvalent carboxylic acids or their derivatives with one or more polyhydric alcohols, it is preferable to terminate the reaction at a Gardner viscosity of T-$Z_3$ at 25° C., more preferably V-Z at 25° C., when measured in a cresol solution containing 40% by weight of the resin sampled. If the reaction is terminated before a Gardner viscosity of T, heat resistance of the resulting coating becomes insufficient, and if terminated later than a Gardner Viscosity of $Z_3$, storage stability of the resulting coating lowers.

Examples of polyvalent carboxylic acids or their derivatives are terephthalic acid, isophthalic acid, orthophthalic acid, trimellitic acid, hemimellitic acid, pyromellitic acid, benzophenonetetracarboxylic acid, 1,2,3,4-butanetetracarboxylic acid, maleic acid, adipic acid, succinic acid; compounds containing amide bonds and imide rings in the molecule, for example, those represented by the formula:

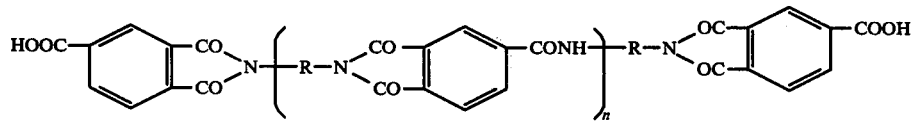

wherein n is 1 to 4; and R is a bivalent organic group such as —$(CH_2)_m$—,

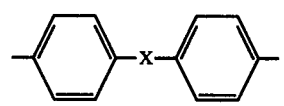

(X=$CH_2$, O, S, $SO_2$, etc.),

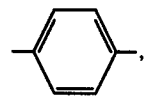

etc., imide dicarboxylic acids containing one or more imide rings in the molecules, for example, those represented by the formulae:

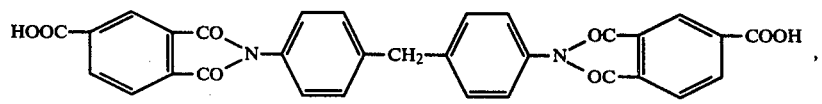

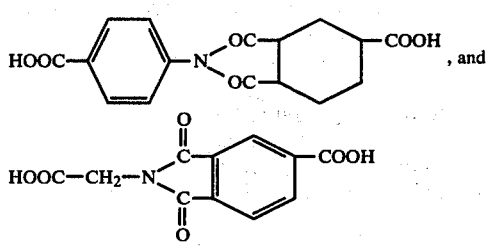

, and acid anhydrides of these polyvalent carboxylic acids, esters of these polyvalent carboxylic acids, and the like.

Examples of polyhydric alcohols are ethylene glycol, diethylene glycol, triethylene glycol, propylene glycol, dipropylene glycol, tripropylene glycol, 1,3-butanediol, 1,4-butanediol, 1,3-propanediol, 1,6-hexanediol, neopentyl glycol, trimethylolethane, trimethylolpropane, glycerin, pentaerythritol, diglycerin, dipentaerythritol, tris(2-hydroxyethyl) isocyanurate, and the like.

The reaction of one or more polyvalent carboxylic acids or their derivatives with one or more polyhydric alcohols can easily be carried out by a conventional process. There is no limitation in reaction methods. For example, the reaction can be carried out at a temperature of 150°–250° C. for 5–8 hours under a nitrogen atmosphere.

The solvent used in this invention is one or more carboxylic acid esters of the formula (I). Examples of the carboxylic acid esters are dimethyl adipate, diethyl adipate, dipropyl adipate, dibutyl adipate, methylethyl adipate, dimethyl glutarate, diethyl glutarate, dipropyl glutarate, dibutyl glutarate, methylethyl glutarate, dimethyl succinate, diethyl succinate, dipropyl succinate, dibutyl succinate, methylethyl succinate, methylpropyl succinate, and the like.

The carboxylic acid ester of the formula (I) is used as a solvent alone or as a mixture of two or more thereof, and further may contain one or more other solvents such as polyhydric alcohol derivatives of the formulae:

$R_1COO(CHR_2CH_2O)_nH$

$R_1COO(CHR_2CH_2O)_nCOR_3$

$R_1O(CHR_2CH_2O)_nR_4$

$R_1O(CHR_2CH_2O)_nH$

$R_1COO(CHR_2CH_2O)_nR_5$ wherein $R_1$, $R_3$, $R_4$ and $R_5$ are independently a lower alkyl group, an aryl group, or an aralkyl group; $R_2$ is hydrogen or a methyl group; and n is an integer of 1 to 3; xylene, Hisol 100, Hisol 150 (each trade mark for a mixture of aromatic hydrocarbons having high boiling points, manufactured by Nippon Oil Co., Ltd.), dimethylacetamide, dimethylformamide, N-methyl-2-pyrrolidone, cresol, xylenol, and the like so far as not influence the effects of the carboxylic acid ester of the formula (I).

The coating composition of this invention thus obtained can be used for electrical insulation as it is, but it is preferable to add a curing agent to the coating composition in order not only to accelerate curing at baking but also to improve physical and chemical properties of the resulting coating film. As the curing agent, there may be used organic titanium compounds usually used in electrical insulating coatings such as tetrabutyl titanate, tetraisopropyl titanate, tetraphenyl titanate, and the like; chelate compounds obtained by treating these titanium compounds with triethanolamine, ethyl acetoacetate, acetyl acetone, and the like.

Further the coating composition of this invention may contain block isocyanate compounds such as Desmodur CT Stable or AP Stable (manufactured by Bayer A. G.), MS-50 (manufactured by Nippon Polyurethane Co.) and the like; metal salts of organic acids such as cobalt naphthenate, zinc naphthenate, zinc octoate, manganese octoate, tin octoate, and the like; and other conventional additives such as phenolic resins and melamine resins. Particularly, in the case of an urethane varnish, a combination of a polyester resin and AP Stable or MS-50 can give a varnish having excellent properties.

According to this invention, there are obtained electrical insulating coatings having good various properties as electrical insulating coatings, and no irritating smell. Since phenols are not used in the coating composition, handling is very easy and there is no danger of producing a burn when touched on the skin. Moreover, electrical insulating coating compositions having higher resin content than that of conventional ones can be obtained.

The invention is illustrated but not limited by the following Examples in which percents are by weight unless otherwise specified.

EXAMPLE 1

In a 2-liter four-necked flask equipped with a condenser, a thermometer, a nitrogen introducing pipe and a stirrer, 158 g of ethylene glycol, 243 g of glycerin, 161 g of diethylene glycol, 1092 g of dimethyl terephthalate, 312 g of isophthalic acid, and 1.96 g of tetrabutyl titanate were placed and the reaction was carried out while raising the temperature from 150° C. to 225° C. gradually for 8 hours under a nitrogen atmosphere. During the reaction, by-produced methanol and water were taken out of the reaction system through the condenser. When the temperature became 225° C., a sample was taken from the contents of the flask, while maintaining said temperature, to measure a Gardner viscosity in a cresol solution containing 40% of the resin sampled. When a Gardner viscosity became X-Y, heating was stopped and the flask was cooled. The resin thus obtained (700 g) was taken out and dissolved in a mixed solution of 490 g of dimethyl succinate and 210 g of dimethyl glutarate. Further, 28 g of tetrabutyl titanate and 3.5 g of cobalt octoate were added to the mixture to give an electrical insulating coating composition having a resin content of 50% and a viscosity of 70 poises.

EXAMPLE 2

The resin (700 g) obtained in Example 1 was taken out and dissolved in a mixed solution of 210 g of ethylene glycol monoethyl ether acetate and 490 g of dimethyl adipate. In addition, 28 g of dibutyl diacetyl acetone titanate was added to the resulting mixture to give an electrical insulating coating composition having a resin content of 50% and a viscosity of 60 poises.

EXAMPLE 3

Using the same procedure as described in Example 1, the reaction was carried out by using 251 g of ethylene glycol, 166 g of glycerin, 776 g of dimethyl tetraphthalate, 208 g of isophthalic acid, 99 g of diaminodiphenylmethane, 192 g of trimellitic anhydride, and 1.69 g of tetrabutyl titanate. Subsequently, 600 g of the product was dissolved in 600 g of dimethyl succinate. Further, 24 g of titanium dibutyl diethyl acetoacetate and 3 g of cobalt octoate were added to the mixture to give an electrical insulating coating composition having a resin content of 50% and a viscosity of 55 poises.

EXAMPLE 4

The resin (600 g) obtained in Example 3 was taken out and dissolved in a mixed solution of 360 g of dimethyl succinate, 120 g of dimethyl glutarate, and 120 g of dimethyl adipate. In addition, 24 g of titanium dibutyl diethyl acetoacetate was added to the resulting mixture to give an electrical insulating coating composition having a resin content of 50% and a viscosity of 61 poises.

EXAMPLE 5

Using the same procedure as described in Example 1, the reaction was carried out by using 167 g of ethylene glycol, 126 g of glycerin, 357 g of tris(2-hydroxyethyl) isocyanurate, 679 g of dimethyl terephthalate, 249 g of isophthalic acid, and 1.58 g of tetrabutyl titanate. Then, 700 g of the resin produced was dissolved in a mixed solution of 140 g of diethylene glycol dimethyl ether, 420 g of dimethyl succinate, and 140 g of dimethyl adipate. Further, 28 g of dibutyl acetyl acetone titanate was added to the resulting mixture to give an electrical insulating coating composition having a resin content of 50% and a viscosity of 58 poises.

EXAMPLE 6

The resin (400 g) obtained in Example 5 was taken out and dissolved in a mixed solution of 40 g of diethyl adipate, 80 g of diethyl glutarate, and 280 g of diethyl succinate. Subsequently, 16 g of dibutyl diacetyl acetone titanate was added to the resulting mixture to give an electrical insulating coating composition having a resin content of 50% and a viscosity of 60 poises.

EXAMPLE 7

Using the same procedure as described in Example 1, the reaction was carried out by using 100 g of ethylene glycol, 392 g of glycerin, 366 g of adipic acid, 370 g of phthalic anhydride and 1.2 g of tetrabutyl titanate. During the reaction, a sample was taken out of the flask to measure a Gardner viscosity in a cresol solution containing 40% of the resin sampled. When a Gardner viscosity became U, heating was stopped and the falsk was cooled. The resin thus produced (400 g) was taken out and dissolved in a mixed solution of 697 g of ethylene glycol monoethyl ether acetate and 1046 g of dimethyl succinate. Subsequently, 762 g of Dismodur AP Stable (manufactured by Bayer A. G.) was added to the resulting mixture to give an electrical insulating coating composition having a resin content of 40% and a viscosity of 1.8 poises.

The coating compositions obtained in Examples 1, 3, and 5 were coated on copper wires having a diameter of 1.0 mm and baked at temperatures 300° C./350° C./400° C. (at entrance/the middle/exit) with a speed of 8 m/min. and the coating and baking procedures were repeated 5 times. The coating composition obtained in Example 7 was coated on copper wires having a diameter of 0.4 mm and baked at temperatures 330° C./380° C. (at entrance/exit) with a speed of 25 m/min and the coating and baking procedures were repeated 5 times. Various properties of the enamelled wires were measured with the results as shown in Table 1.

For comparison, a conventional polyester varnish and a conventional polyurethane varnish were also tested.

The conventional polyester varnish was prepared as follows. A resin obtained by using ethylene glycol, glycerin, dimethyl terephthalate and isophthalic acid (equivalent ratio 78:42:90:10) and synthesizing under conventional conditions was dissolved in a mixed solution of cresol/xylene=80/20 (weight ratio) so that a resin content became 40%.

The conventional polyurethane varnish was prepared as follows. A polyester polyol synthesized from phthalic anhydride, adipic acid, ethylene glycol and glycerin by using the alcohol components in excess under conventional reaction conditions and a block isocyanate (Desmodur AP Stable, trade mark, manufactured by Bayer A. G.) were dissolved in a mixed solution of cresol/xylene=60/40 (weight ratio) so that a resin content became 35%.

Enamelled wires were prepared by using the conventional varnishes as mentioned above and by repeating the coating and baking procedures as mentioned above 6 times. The resulting enamelled wires had the properties as shown in Table 1.

Test methods are as follows:
Cut through temperature:

Two enamelled wires of about 10 cm long were placed on a flat plate so that one was placed over the other at a right angle. On the piled part of the wires, a weight having a prescribed mass was placed and put in a heating chamber in this state. The temperature of the heating chamber was raised at a rate of 3° C./min. A temperature at which the wire faulted was measured.
The other properties:
JIS-C-3003

Table 1

| Example No. | 1 | 3 | 5 | 7 | Comparison Conventional polyester varnish | Conventional polyurethane varnish |
|---|---|---|---|---|---|---|
| Dimension (bare wire) (mm) | 0.998 | 0.998 | 0.998 | 0.398 | 0.998 | 0.398 |
| (film thickness) (mm) | 0.040 | 0.040 | 0.040 | 0.019 | 0.040 | 0.019 |

Table 1-continued

| | | | | | Comparison | |
|---|---|---|---|---|---|---|
| Example No. | 1 | 3 | 5 | 7 | Conventional polyester varnish | Conventional polyurethane varnish |
| Flexibility: Mandrel test at 15% elongation (crack) | 1X OK | 1X OK | 1X OK | 1X OK | 1X OK | 1X OK |
| Heat-shock (150° C. - 1 hour) (crack) | 3X OK | 2X OK | 3X OK | 1X OK | 3X OK | 1X OK |
| Cut through temperature (load 2 kg) (°C.) | 320 | 320 | 340 | 245* | 310 | 240 |
| Thermal degradation (200° C. - 6 hours) (crack) | 1X OK | 1X OK | 1X OK | 1X OK | 1X OK | 1X OK |
| Chemical resistance (23° - 24 hrs) Benzene | 4H | 4H | 4H | 4H | 4H | 4H |
| NaOH (3%) | 4H | 4H | 4H | 4H | 4H | 4H |
| H₂SO₄ (s.g. 1.2) | 4H | 4H | 4H | 4H | 4H | 4H |

(Note) *Load 300 g

As is clear from Table 1, the coating compositions according to the present invention show the same or more excellent properties comparing with the conventional varnishes.

As is clear from the explanations mentioned above, the coating composition of this invention has no irritating smell comparing with the conventional ones using phenols, and is very easy for handling since no burn is produced if it is touched on the skin by mistake. Moreover, since a resin concentration of the coating compositions is very high, enamelled wires with the desired thickness of the coated film can be obtained with less times of repeating of coating and baking procedures comparing with the known varnishes. Further since the proportion of non-volatile materials is very high in the coating composition of this invention and thus the solvent, which does not participate in the formation of coating film, is used rather in smaller amount, the production cost for enamelled wires can advantageously be reduced and the saving of resources can also be attained.

What is claimed is:

1. An electrical insulating coating composition which comprises a resin prepared by reacting one or more polyvalent carboxylic acids or their derivatives with one or more polyhydric alcohols in which trihydric or higher polyhydric alcohols are used in an amount of 35% by equivalent or more based on the total hydroxyl group equivalent of the polyhydric alcohols, and as a solvent for said resin one or more carboxylic acid esters of the formula:

$$R_1OOCR_2COOR_3$$

wherein $R_1$ and $R_3$ are independently a lower alkyl group; and $R_2$ is $-(CH_2)_m-$ wherein m is an integer from 1 to 10.

2. A composition according to claim 1, wherein the carboxylic acid ester is selected from the group consisting of dimethyl adipate, diethyl adipate, dipropyl adipate, dibutyl adipate, methylethyl adipate, dimethyl glutarate, diethyl glutarate, dipropyl glutarate, dibutyl glutarate, methylethyl glutarate, dimethyl succinate, diethyl succinate, dipropyl succinate, dibutyl succinate, methylethyl succinate, and methylpropyl succinate.

3. A composition according to claim 1, wherein dimethyl succinate and/or dimethyl adipate are used as the solvent.

4. A composition according to claim 1, wherein dimethyl glutarate and dimethyl succinate and/or dimethyl adipate are used as the solvent.

5. A composition according to claim 1, wherein the carboxylic acid ester is selected from the gorup consisting of dimethyl adipate, diethyl adipate, dimethyl glutarate, diethyl glutarate, dimethyl succinate and diethyl succinate.

6. A composition according to claim 1, wherein the lower alkyl group contains from 1 to 6 carbon atoms.

7. A composition according to claim 1, wherein the resin is prepared by terminating the reaction of one or more polyvalent carboxylic acids or their derivatives with one or more polyhydric alcohols at a Gardner viscosity of T-Z₃ at 25° C. when measured in a cresol solution containing 40% by weight of the resin.

REEXAMINATION CERTIFICATE (58th)

United States Patent [19]
Okada et al.

[11] B1 4,209,438
[45] Certificate Issued  Mar. 8, 1983

[54] ELECTRICAL INSULATING COATING COMPOSITION

[75] Inventors: Yasunori Okada; Junzo Fukuhara, both of Hitachi, Japan

[73] Assignee: Hitachi Chemical Company, Ltd., Japan

Reexamination Request
No. 90/000,187, Apr. 7, 1982

Reexamination Certificate for:
Patent No.: 4,209,438
Issued: Jun. 24, 1980
Appl. No.: 959,503
Filed: Nov. 13, 1978

[30] Foreign Application Priority Data

Nov. 14, 1977 [JP] Japan ................. 52-136459

[51] Int. Cl.$^3$ ............................ C08K 5/11
[52] U.S. Cl. ... 524/314, 524/308, 524/317, 524/604
[58] Field of Search ....................... 524/314

[56] References Cited

U.S. PATENT DOCUMENTS

| | | | |
|---|---|---|---|
| 2,889,304 | 6/1959 | Sheffer et al. | 260/33.4 |
| 2,936,296 | 5/1960 | Precopio et al. | 260/33.4 |
| 3,022,200 | 2/1962 | Koerner et al. | 117/218 |
| 3,426,098 | 2/1969 | Meyer et al. | 260/841 |

OTHER PUBLICATIONS

Chemical Marketing Reporter, February 2, 1976 issue, p. 18; Article—"Du Pont Has Esters From Adipic Operation."

Chemical Marketing Reporter, March 8, 1976 issue, p. 14; Advertisement—"New from Du Pont: A family of low-cost dibasic esters."

Chemical Marketing Reporter, October 24, 1977 issue, p. 39; Advertisement—"Lower your retarder solvent costs with Du Pont DBE's."

W. E. Allsebrook, "Developments in Wire Enamels", Paint Manufacture, May 1969.

C. M. Hansen, "The Three Dimensional Solubility Parameter—Key to Paint Component Affinities: I. Solvents, Plasticizers, Polymers and Resins", Journal of Paint Technology *39*, pp. 104-117 (2/67).

The Condensed Chemical Dictionary, Eighth Edition, Van Nostrand Reinhold Company 1971, p. 298.

Beilsteins Handbuch—Der Organischen Chemie, Edwards Brothers, Inc., on behalf of the Alien Property Custodian, 1943, p. 633.

The Merck Index of Chemicals and Drugs, Seventh Edition, P. G. Stecher, Editor, Merck & Co. Inc., 1960, p. 436.

Introduction to Paint Chemistry, G.P.A. Turner, Chapman and Hall, 1967, pp. 134-135.

*Primary Examiner*—Paul R. Michl

[57] ABSTRACT

A polyester resin, polyester-imide resin or polyester-amide-imide resin dissolved in one or more carboxylic acid esters of the formula: $R_1OOCR_2COOR_3$, wherein $R_1$ and $R_3$ are independently a lower alkyl group; and $R_2$ is a bivalent organic group, gives electrical insulating coating compositions having a high resin content and excellent various properties and being easily handled without having irritating smell.

REEXAMINATON CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1-7 is confirmed.

* * * * *